US009007227B2

(12) United States Patent
Carralero et al.

(10) Patent No.: US 9,007,227 B2
(45) Date of Patent: Apr. 14, 2015

(54) MULTIMODE FIBER INTERROGATOR (75) Inventors: Michael A. Carralero, Huntington Beach, CA (US); Ty A. Larsen, Everett, WA (US); Priya D. Maratukulam, Seattle, WA (US)

(73) Assignee: The Boeing Company, Chicago, IL (US)

( * ) Notice: Subject to any disclaimer, the term of this patent is extended or adjusted under 35 U.S.C. 154(b) by 353 days.

(21) Appl. No.: 13/343,502

(22) Filed: Jan. 4, 2012

(65) Prior Publication Data

US 2013/0169445 A1 Jul. 4, 2013

(51) Int. Cl.
*G08B 21/00* (2006.01)
*G01D 5/353* (2006.01)
*G08G 5/00* (2006.01)
*G01J 1/04* (2006.01)
*G01M 17/00* (2006.01)
*G02B 6/00* (2006.01)
*G01N 21/00* (2006.01)

(52) U.S. Cl.
CPC .................... *G01D 5/3538* (2013.01)

(58) Field of Classification Search
CPC ........... G02B 6/06; G01N 21/01; G07C 11/00
USPC ...................... 340/657, 945; 385/12; 701/29.4
See application file for complete search history.

(56) References Cited

U.S. PATENT DOCUMENTS

| 2002/0148951 A1* | 10/2002 | Nakamura et al. ............ 250/216 |
| 2003/0016721 A1* | 1/2003 | Naganuma et al. ............ 372/97 |
| 2003/0191564 A1* | 10/2003 | Haugse et al. ................. 701/29 |
| 2006/0093254 A1 | 5/2006 | Mozdy |
| 2006/0182382 A1* | 8/2006 | Gollier et al. ................. 385/12 |
| 2007/0009260 A1* | 1/2007 | Bothwell et al. .............. 398/33 |
| 2010/0008619 A1* | 1/2010 | Sailor ............................ 385/13 |
| 2010/0241906 A1* | 9/2010 | Thompson et al. ............ 714/40 |
| 2010/0247027 A1 | 9/2010 | Xia et al. |
| 2011/0097031 A1* | 4/2011 | Carralero et al. .............. 385/12 |
| 2012/0201656 A1* | 8/2012 | Johnston ...................... 415/118 |

FOREIGN PATENT DOCUMENTS

DE    102006046693 A1    4/2008

OTHER PUBLICATIONS

Coombe, Brian; "A Survey of MEMS-Enabled Optical Devices-Applications and Drivers for Deployment," Bechtel Telecommunications Technical Journal, vol. 4, No. 1, Jan. 2006.
Agilent Technologies, "Why LED is the preferred light source for multimode fiber attenuation measurement?" White Paper.
Liu, Tongyu, et al, "A low-cost multimode fiber Bragg grating sensor system," Advances Sensor Systems and Applications II, Proceedings of SPIE vol. 5634, Bellingham, WA, 54-61.
Gong, Jianmin, et al, "Toward low-cost optical fiber interrogators," SPIE Newsroom, Jul. 27, 2011.

(Continued)

*Primary Examiner* — Jack K Wang
(74) *Attorney, Agent, or Firm* — Parsons Behle & Latimer (57) ABSTRACT An optical interrogator system including a broad spectrum light source capable of emitting light having a spectral width spanning at least approximately 20 nm, and at least one optical sensor coupled to the broad spectrum light source by at least one multimode optical fiber, wherein the at least one multimode optical fiber is configured to support a plurality of propagation modes, and a method of using the same are disclosed herein.

23 Claims, 6 Drawing Sheets (56) References Cited

OTHER PUBLICATIONS

Wanser, Keith H., et al, "Novel Fiber Devices and Sensors Based on Multimode Fiber Bragg Gratings," 10th Optical Fibre Sensors Conference, 265-268.

Wavelength Division Multiplexing—CWDM vs. DWDM, Communication Consultants, Fargo, ND, Jul. 2006.

International Search Report for PCT/US2012/063733 dated Jul. 18, 2013.

* cited by examiner

MULTIMODE FIBER INTERROGATOR

CROSS-REFERENCE TO RELATED APPLICATIONS

This application is related to U.S. Non-Provisional application Ser. No. 12/589,668, titled Light-Weight Robust Optical Sensor Interrogation System; U.S. Non-Provisional application Ser. No. 12/859,255, titled Magnetically Actuated Photonic Crystal Sensor; U.S. Non-Provisional application Ser. No. 13/149,369, titled Multi-functional Fiber Array Sensor.

BACKGROUND

The present application relates generally to the field of optical sensors and more specifically to fiber optic sensor interrogation systems.

Aerospace vehicles and systems are typically equipped with instruments that monitor the status and/or condition of various systems by acquiring, exchanging and analyzing data, and the communication networks in such arrangements must be robust enough to withstand repetitive and potentially destructive forces and conditions, while transmitting and processing the data collected.

In recent years, there has been a trend to use optical apparatus in lieu of electrical or mechanical devices for the purpose of monitoring the status and/or condition of such systems. Optical interrogation systems are integral components in status and/or condition monitoring systems used in chemical, biological, temperature and pressure sensing environments. Optical sensing techniques are highly desirable for aerospace applications due to the lighter weight and EMI continuity, but to date such sensor systems have proven too costly or complicated to deploy.

One potential drawback to current optical sensing techniques is that current optical based sensing systems tend to make heavy use of lasers. The monochromatic light and ability to couple into single mode fiber makes the pairing a good solution for many applications, but has resulted in difficulties for aerospace use. The sensitivity of laser based systems, and the declining use of single mode fiber has led the inventors to look into other methods of optical sensor interrogation. Communication based systems are increasingly using a low cost laser type called Vertical Cavity Surface Emitting Laser (VCSEL). Such devices in the past had been relatively failure-prone and prone to damage when used in adverse environments, such as areas of high humidity. While costs for such devices are dropping, and reliability is increasing, these devices still are not clearly desirable for use in an aerospace environment, in particular when looking at new technology sensor solutions such as photonic crystal sensors.

Another potential drawback is the traditional approach to sensing within sensor systems. Various solutions have been proposed and tried, including Fiber Bragg Grating (FBG) type sensor systems, fiber optic path sensing, piezoelectric transducers, comparative vacuum monitors, strain gauge based systems, ultrasonic systems, and visual indicators, but each has challenges.

SUMMARY

In one embodiment, an optical interrogator system includes a broad spectrum light source capable of emitting light having a spectral width spanning at least approximately 20 nm, and at least one optical sensor coupled to the broad spectrum light source by at least one multimode optical fiber, wherein the at least one multimode optical fiber is configured to support a plurality of propagation modes.

In another embodiment, a method of sensing at least one parameter with an optical interrogator system comprises a broad spectrum light source coupled to at least one optical sensor via a multimode optical fiber. The method further comprises emitting an optical signal with a spectral width of at least 20 nm, transmitting the optical signal along the multimode optical fiber to the at least one optical sensor, and reflecting the optical signal along the multimode optical fiber, wherein the reflected optical signal comprises at least one sensed parameter.

In yet another embodiment of the current application, a vehicle, comprises an optical interrogator system coupled to a monitoring system, wherein the monitoring system is configured to receive a signal from the optical interrogator system. The optical interrogator system includes a broad spectrum light source capable of emitting light having a spectral width spanning at least approximately 20 nm, and at least one optical sensor coupled to the broad spectrum light source by at least one multimode optical fiber, wherein the at least one multimode optical fiber is configured to support a plurality of propagation modes.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
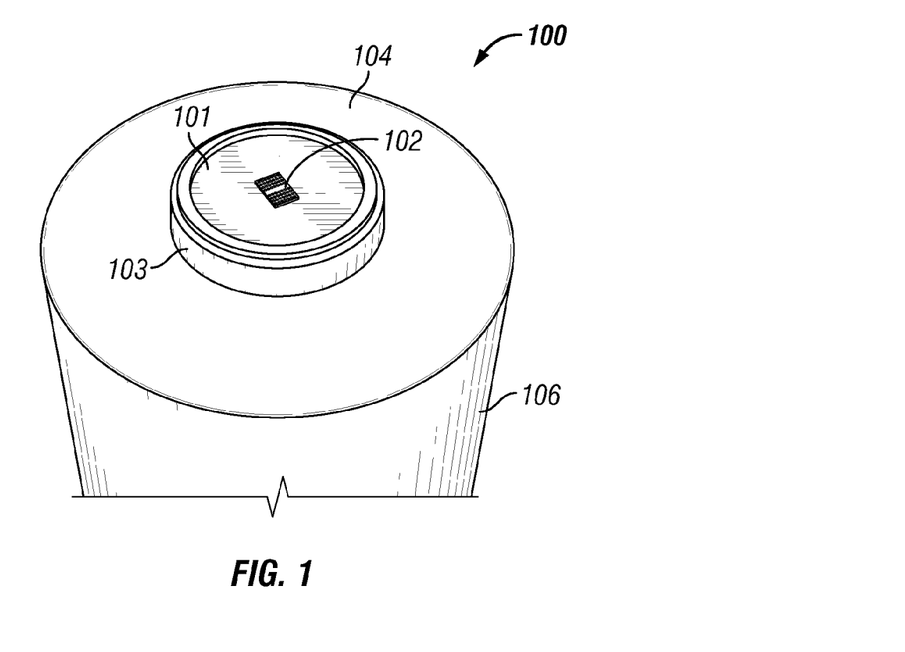
FIG. 1 is a perspective view of an exemplary optical sensor and fiber.

FIG. 1 shows a perspective view of an exemplary optical sensor 100 and a multimode optical fiber 106. In the illustrated embodiment, the optical sensor 100 includes a photonic crystal 102 coupled to an end face 104 of the multimode optical fiber 106. The optical sensor 100 has a sheathing 103 and is coupled within the core 101 of the multimode optical fiber 106. As used herein, the term "multimode optical fiber" means fiber that supports a plurality of propagation modes. Typically, multimode optical fibers have a larger core than conventional single mode fibers, as described in more detail below in connection with FIGS. 7A and 7B.

In operation, photonic crystal 102 may be configured to sense, detect, control, and/or reflect light that travels along the core 101 of the multimode optical fiber 106. In one embodiment, the photonic crystal 102 may be configured to detect, control, and/or reflect the flow of light along the core 101 of the multimode optical fiber 106.

The photonic crystal 102 may be made from a single layer of semiconductor material, but can include several layers of semiconductor material mounted on the end of a fiber strand, such as optical fiber 106. The sensor principle is based on detecting changes in the reflectivity spectrum of photonic crystals. The single layer photonic crystal has a sharp reflection resonance in the wavelength range that is being monitored. Preferably, the photonic crystal sensor is fabricated in a silicon foundry using standard interface characteristics and robustness for operation in harsh operating environments. Depending on the material construction, various effects can be monitored, such as, for example, pressure against the tip of the fiber 106. A more complicated buildup, for example applying a range of voltages to the photonic crystal to change reflectance properties, can allow a "smart" component to use the photonic crystal 102 or wafer as a low powered communications device by modifying light reflectance that can be read by the optical interrogator. Another possible implementation would be to use the fiber 106 as a side-scattering light guide, with a series of photonic crystal patches or a length of photonic crystal material monitored by a single fiber.

Photonic crystal sensors are also less complicated to use and manufacture than Fiber Bragg Grating sensors. Fiber Bragg Grating sensors are currently made by stripping the coating off of existing fibers, "writing" the Bragg Grating into the fiber, and then recoating with a replacement material. Writing the grating into the fiber can be accomplished through the use of a laser and phase mask, as well as other methods. Selection of cladding replacement, write process, and fiber composition can all have an effect on the final sensor performance. This is a relatively complicated process to perform.

Fiber Bragg Grating sensors can be highly sensitive, which is a benefit, and they lend themselves to in-line construction along the length of a single fiber, capable of simultaneously reading data from 20 or more sensors. However, such devices operate by changing the wavelength of reflected light (short wavelength typically) across its length. This operational mode drives a lot of the complexity of the system into the interrogation equipment of the sensors, as it must be capable of reading extremely small changes (interference effects caused by all Fiber Bragg Reflection) in wavelength at very low amplitudes of reflected light. The small changes in wavelength, it appears, are a direct result of a great deal of variability introduced during fabrication which can complicate construction.

Additionally, Fiber Bragg Grating sensor operation requires a change along its length (e.g., stretching, bending, pressure, etc.). In some cases this is advantageous, but in most others, where a single point of interest needs to be monitored, it can be a liability. The length-wise change requirement also tends to make the sensors naturally sensitive to temperature changes (due to the flexing or stretching of the fiber sections) which must be compensated for.

In contrast, photonic crystals offer mass manufacturing capability, repeatability, and a highly controlled sensing area. These devices also act more as pure reflectors, with a greater return of incident light. Crystal lattices are fabricated using existing semiconductor techniques. These devices can then be cut out of wafers in much the same way as integrated circuits are. For a basic installation, a fiber end can be polished using existing telecommunications equipment, such as, for example, traditional fiber polishing machines, and a lattice wafer is adhered to its surface. This element may be left bare, or it can be coated with a material that protects the crystal from destructive environmental conditions, depending on the intended application. The use of photonic crystals significantly reduces the weight and complexity of the components that make up the interrogator system of the present application, thereby permitting miniaturization of the system.

Figure 2:
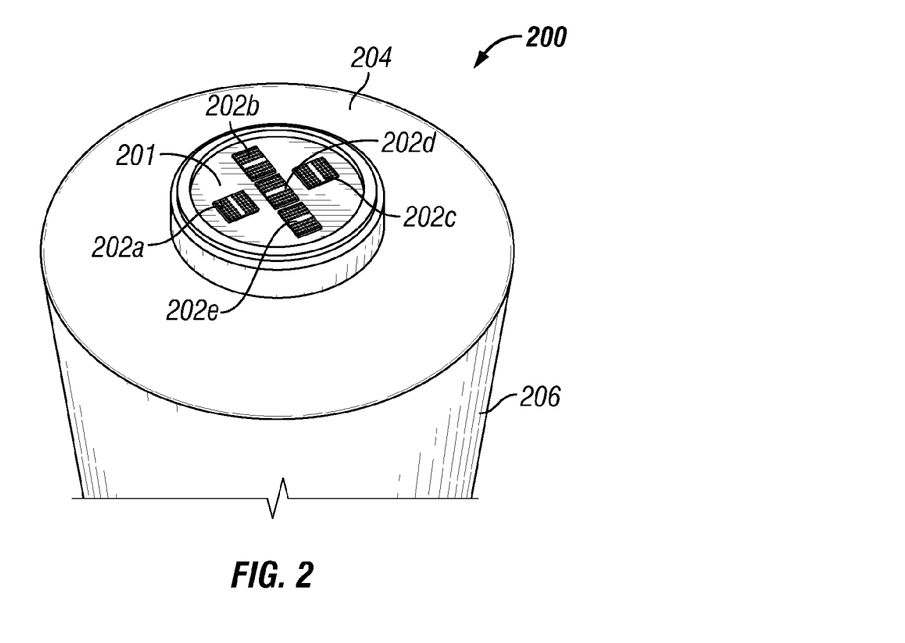
FIG. 2 is a perspective view of another exemplary optical sensor and fiber.

As illustrated in FIG. 1, a single photonic crystal 102 may be employed in some embodiments of an optical sensor 100. However, in other embodiments, as shown in FIG. 2, an optical sensor 200 may include a one or two dimensional array of photonic crystals, or more generally, a photonic crystal system, such as photonic crystal sensors 202a-e. For example, in the embodiment illustrated in FIG. 2, the optical sensor 200 comprises a multimode optical fiber 206 having a core 201 and an end 204, and an array of five photonic crystal sensors 202a-e is coupled to the end 204 of the multimode optical fiber 206. The arrangement of the photonic crystal sensors 202a-e enables the optical sensor 200 to cover, to the extent possible, the surface of the core 201 with photonic crystal sensors 202a-e. In other embodiments, of course, the optical sensor 200 may include more or less than the five photonic crystal sensors 202a-e shown in FIG. 2.

Each of the photonic crystal sensors 202a-e may be associated with a different reflection spectrum. In operation, the reflection spectrum of each of the photonic crystal sensors 202a-e may change in response to one or more sensed parameters. For example, the reflection spectra of the first photonic crystal sensor 202a and the second photonic crystal sensor 202b may each change in response to the same sensed parameter, such as temperature. In another example, the reflection spectra of the third photonic crystal sensor 202c and the fourth photonic crystal sensor 202d may each change in response to a second sensed parameter, such as pressure. Information descriptive of changes in the sensed parameters may be transmitted via the multimode optical fiber 206 by way of the reflection spectra of the photonic crystal sensors 202a-e. Information from the one of the photonic crystal sensors 202a-e may be differentiated from information from another of the photonic crystal sensors 202a-e based on the different wavelengths of the reflection spectra from the photonic crystal sensors 202a-e. Thus, the optical sensor 200 may include two or more photonic crystal sensors that together provide an indication of one or more sensed parameters.

Figure 3:
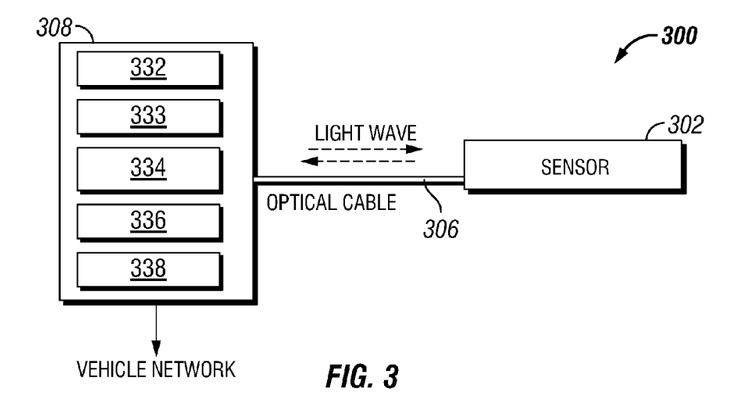
FIG. 3 is a schematic view of one embodiment of an optical interrogation system.

FIG. 3 is a block diagram that illustrates a simple optical interrogator system 300. In the illustrated embodiment, the interrogator system 300 includes an optical interrogator 308 coupled to a sensor 302 via a multimode optical fiber or cable 306. In this embodiment, light may travel along the optical fiber 306 as illustrated by the broken arrows. Also as illustrated, the interrogator system 300 may be coupled to a vehicle network.

The optical interrogator 308 may be configured to convert optical signals into electrical signals, and may be used, for example, by a vehicle status and/or condition management system to monitor the status of system sensors located at remote locations in the vehicle.

In operation optical interrogator 308 may comprise a fiber optic receiver 332 and a fiber optic transmitter 333, and may transmit light along the multimode optical fiber 306 (as represented by the broken arrows in FIG. 3) to a sensor 302. In an alternative embodiment, fiber optic receiver 332 and fiber optic transmitter 333 may be combined in an optical transceiver unit. In one embodiment, the sensor 302 may comprise one or more photonic crystals, as discussed in relation to FIGS. 1 and 2, which may be configured to reflect, detect, monitor, and control the light transmission from the transmitter 333 of the optical interrogator 308. The optical interrogator 308 may also be configured to convert the optical signal received from the sensor 302 along the multimode optical fiber into an electrical signal via an analog-to-digital converter 336. Furthermore, the optical interrogator 308 may be configured to transmit the resultant electrical signal to any one of a plurality of vehicle networks. For example, the optical interrogator 308 may be configured to transmit a signal to an optical sensor assembly associated with, for example, the status of a door on the vehicle, or a fuel tank on the vehicle, just to name two possible examples. Of course, one of ordinary skill in the art would recognize that the current disclosure could be employed in any number of possible vehicle monitoring systems.

According to one embodiment, and in addition to a fiber optic receiver 332, a fiber optic transmitter 333, and an analog-to-digital converter 336, the optical interrogator 308 may comprise, a signal conditioning converter unit 334 and a microcontroller unit 338. The optical interrogator 308 may be coupled to a fiber network and/or a vehicle network.

In operation, the optical transmitter 333 may comprise an LED or some other broad spectrum and/or non-coherent light source, which may be configured to transmit an optical signal. The optical receiver 332 may be configured to receive a reflected light signal via a multimode optical fiber 306. The received signal may be transmitted to a signal conditioning converter unit 334 of the optical interrogator 308. In one embodiment, the signal conditioning converter unit 334 may be configured to condition the signal for conversion by the analog-to-digital converter unit 336.

The optical interrogator 308 may comprise a microcontroller 338, which may be configured to control the respective units and modules of the optical interrogator 308, such as the optical receiver 332, the optical transmitter 333, the optical conditioner 334, and the analog-to-digital converter 336, among other things. In one embodiment, the microcontroller 338 may control the transmission and reception of light from the fiber optic receiver and transmitter units 332 and 333, respectively. The microcontroller 338 may provide the signal conditioning converter 334 with threshold guidelines to assist in the conditioning of a received optical signal, among other things. The microcontroller 338 may be configured to interface with the analog-to-digital converter unit 336 to otherwise provide oversight in the conversion of a received optical signal to a digital electrical signal output. Of course, an ordinary practitioner skilled in the art would readily recognize that an optical interrogator 308 is not limited to the illustrative embodiments discussed herein.

Figure 4:
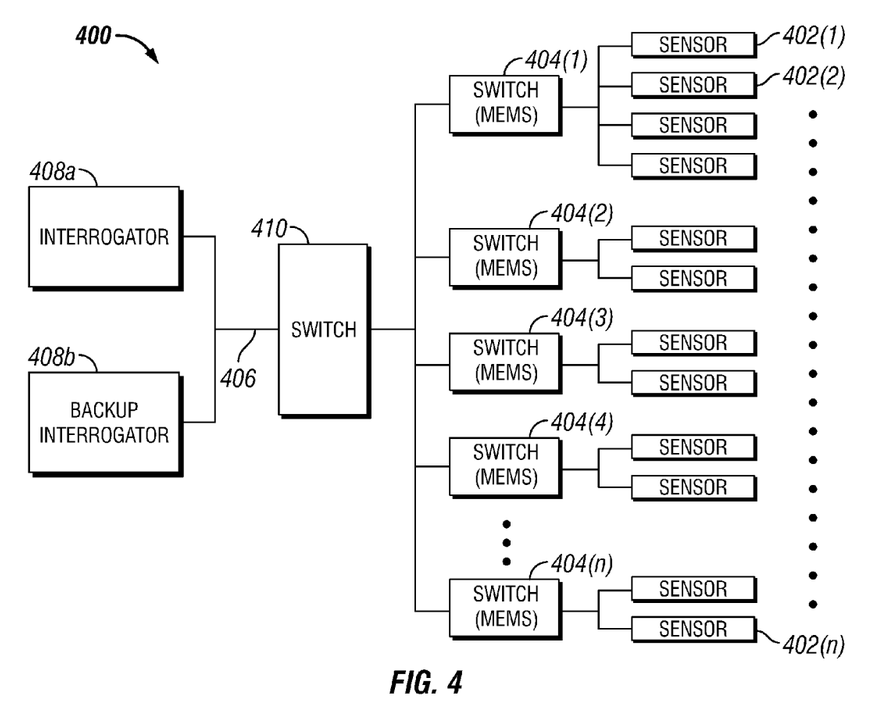
FIG. 4 is a schematic view of another embodiment of an optical interrogation system.

FIG. 4 illustrates another interrogator system 400 according to the present application. In the illustrated embodiment, the interrogator system 400 comprises a plurality of sensors 402(1)-402(n) coupled to a plurality of first optical switches 404(1)-404(n), coupled in turn to a second optical switch 410, which is coupled to an optical interrogator 408a and a backup optical interrogator 408b. The first and/or second optical switches, 404(1)-404(n) and 410 could be microelectromechanical system switches (MEMS), or any other suitable form of optical switches based upon the constraints, tolerances, and needs of the particular system. The backup optical interrogator 408b may be configured to function in much the same way as optical interrogator 408a and as discussed above. The backup optical interrogator 408b may be configured to function in case of failure of optical interrogator 408a.

Each of the optical switches 404(1)-404(n) and 410 may be an integrated, solid-state device that is small, lightweight, and capable of withstanding a wide range of vibrations. Such a device, which may include one or more MEMS, would therefore be reliable in harsh environments, failure tolerant, and easily serviceable. The optical switches 404(1)-404(n) and 410, such as MEMS optical switches, may provide connections to a backup switch, so that an on-board optical network can operate with minimum delay in the case of failure of fiber optic cables. Typically, MEMS optical switches have a switching time on the order of tens of microseconds.

The illustrated embodiment of interrogator system 400 operates according to the same basic operational principles as interrogator system 300, with the added complexity that interrogator system 400 comprises a plurality of optical sensors 402(1)-402(n) that are coupled to optical interrogators 408a and 408b to thereby allow, for example, a single interrogator 408a to monitor a plurality of optical sensors 402(1)-402(n). In operation, optical switches 404(1)-404(n) and 410 may be configured to allow optical interrogator 408a and/or 408b to selectively receive optical signals from optical sensors 402(1)-402(n), and to selectively transmit optical signals to optical sensors 402(1)-402(n). For instance, a MEMS optical switch 404(1) might include an array of micro mirrors configured to selectively deflect light between optical interrogators 408a and 408b and optical sensors 402(1)-402(n). In other embodiments, piezoelectric ceramics could be used to selectively reflect light between optical interrogators 408a and 408b and optical sensors 402(1)-402(n). These are but two possible implementations of a host of switching methods that could be used to selectively deflect or reflect light between optical interrogators 408a and 408b and optical sensors 402(1)-402(n). As discussed above, sensors 402(1)-402(n) may be configured to reflect light at a given wavelength associated with one or more sensed parameters. The reflected light may then propagate back through the multimode fiber network, through the optical switches 404(1)-404(n) and 410 to the optical interrogator 408a and/or the backup optical interrogator 408b. As will be readily apparent to one skilled in the art, the interrogator system 400 comprising a plurality of optical sensors 402(1)-402(n), optical switches 404(1)-404(n) and 410, and optical interrogators 408a and 408b could provide a more robust and failure tolerant system for complex and/or vital vehicle systems.

Figure 5:
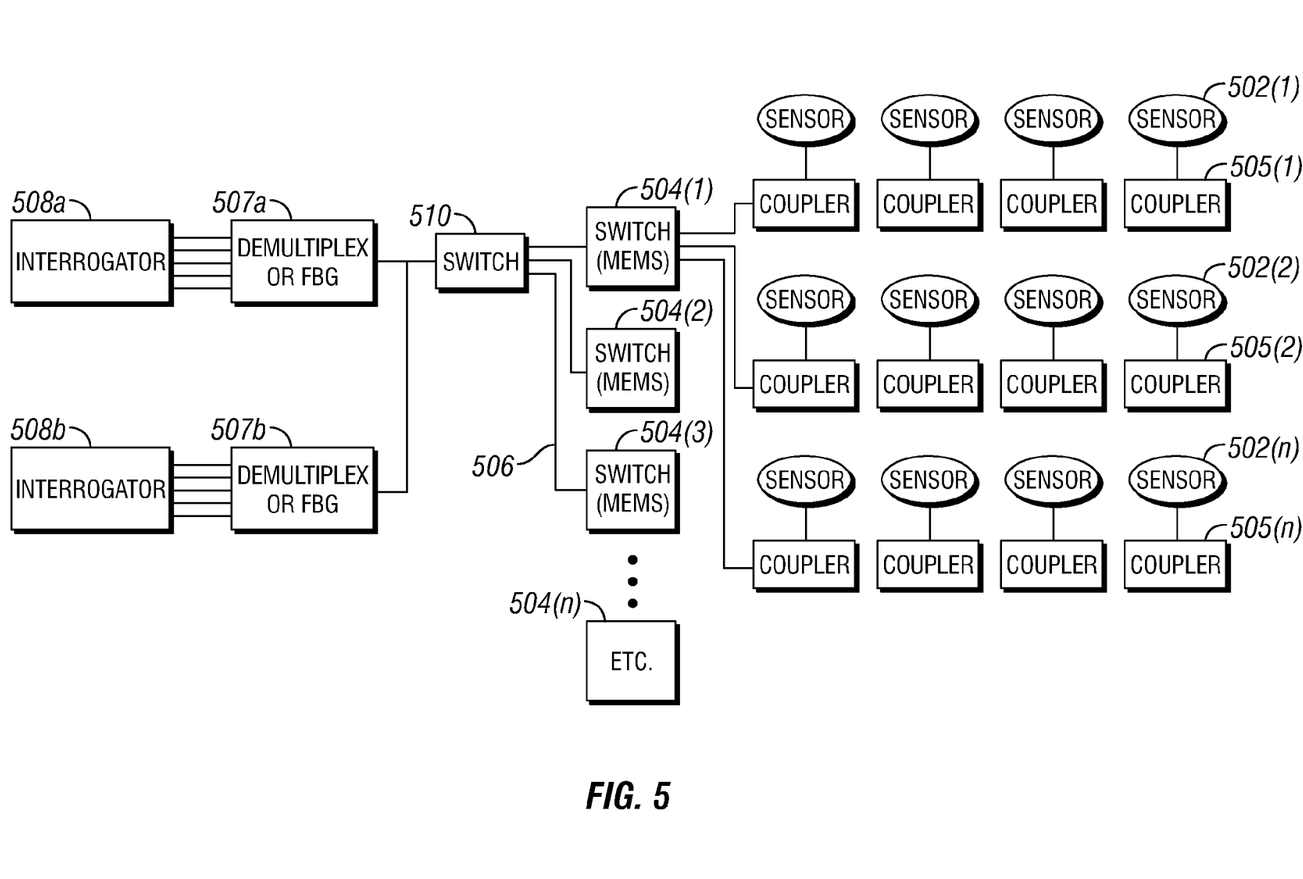
FIG. 5 is a schematic view of another embodiment of an optical interrogation system.

FIG. 5 illustrates another exemplary embodiment of an optical interrogator system 500. In the illustrated embodiment, the optical interrogator system 500 comprises a plurality of optical sensors 502(1)-502(n), each coupled via a coupler 505(1)-505(n), to MEMS optical switches 504(1)-504(n) and, in turn, to optical switch 510. MEMS optical switches 504(1)-504(n) and optical switch 510 are in turn coupled to demultiplexers 507a and 507b, which are coupled to optical interrogators 508a and 508b, respectively. In some embodiments, the couplers 505 comprise partially reflective mirrors configured to reflect a given predetermined wavelength. In other embodiments, couplers 505 may be configured to, among other things, separate light from the light sources in order to illuminate all the sensors 502(1)-502(n), and to combine signals of reflected light from the sensors 502(1)-502(n) back onto one fiber, e.g., multimode optical fiber 506, for transmission to optical interrogator 508a. Generally, demultiplexers 507a and 507b may be configured to extract optical signals transmitted along the multimode fiber optic network, as represented by multimode fiber 506 connecting each element of optical interrogator system 500, into individual optical signals.

In operation, an optical interrogator 508 may transmit an optical signal via the multimode fiber optic network to at least one sensor 502. As discussed above, in one embodiment, the sensor 502 may be configured to reflect a given wavelength of light back through the multimode fiber optic network to the optical interrogator 508. As illustrated in FIG. 5, the optical interrogator system 500 may be configured to provide status information to increasingly complex vehicle monitoring networks, for instance, by providing additional redundancy and capacity via demultiplexers 507a and 507b. Demultiplexers 507a and 507b may operate by isolating different wavelengths of optical signals to a predetermined receiver (e.g., 332) associated with a predetermined optical interrogator 508. Thus, it may be possible to simplify optical interrogator 508 to not require the inclusion of a spectrum analyzer to measure wavelength ranges of incoming signals.

Figure 6A:
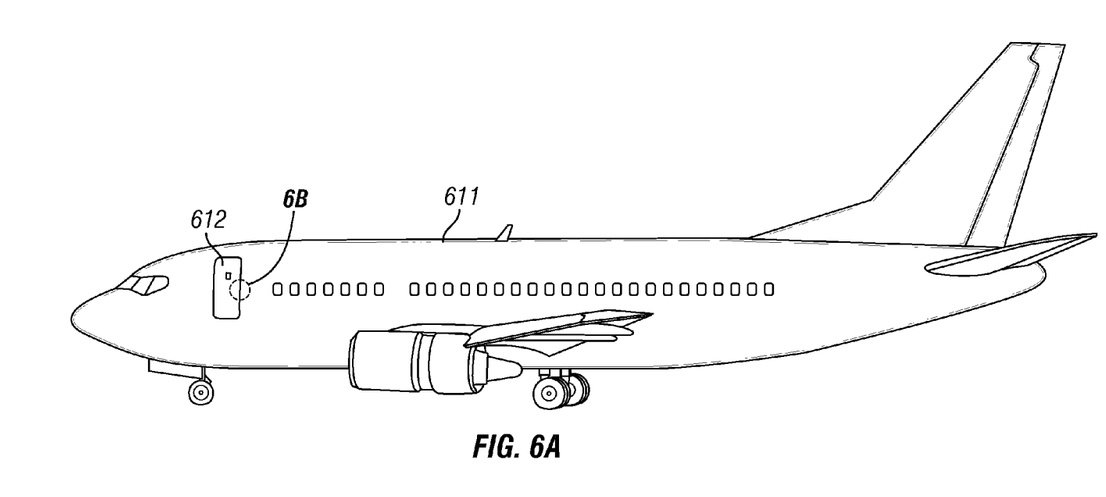
FIGS. 6A and 6B illustrate an advantageous embodiment of an optical interrogation system suggesting an exemplary usage in an aircraft.
Figure 6B:
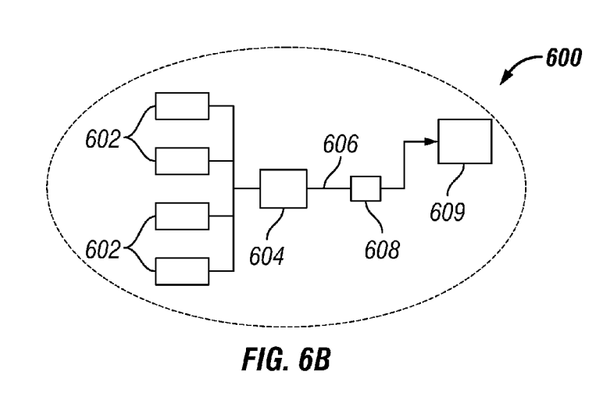

FIGS. 6A and 6B illustrate a door monitoring system 600 of vehicle 611, such as an aircraft, as one example of a system in which one or more optical interrogators described in the present application may be deployed. As illustrated in FIG. 6B, the system 600 comprises a plurality of sensors 602 coupled to an optical switch 604, which is coupled to an optical interrogator 608 via at least one multimode optical fiber 606. The optical interrogator 608 is, in turn, coupled to a monitoring system 609 of the vehicle 611.

In operation, and as described above, the optical interrogator 608 may transmit at least one sensed parameter to the vehicle monitoring system 609. For instance, in one embodiment involving an aircraft door 612, it is possible for the vehicle monitoring system 609 to determine, for instance, pressure and/or temperature parameters detected by the optical interrogator 608. For instance, the optical interrogator 608 may be configured to transmit an optical signal via multimode optical fiber 606, through an optical switch 604, to a plurality of optical sensors 602. The optical sensors 602 may be configured to reflect light of a given wavelength based on a predetermined parameter. The optical switch 604 may be configured to transmit the signal from the optical sensors to the optical interrogator 608, which may, in turn, be configured to convert the optical signal into an electrical signal and transmit the resultant electrical signal to the monitoring system 609 for monitoring, for example, the status and/or condition of the aircraft door 612. Of course, as would be readily understood by one skilled in the art, the principles discussed herein could be used to apply to a multitude of possible systems and uses and are not meant to be constrained by the current discussion of aircraft doors.

Figure 7A:
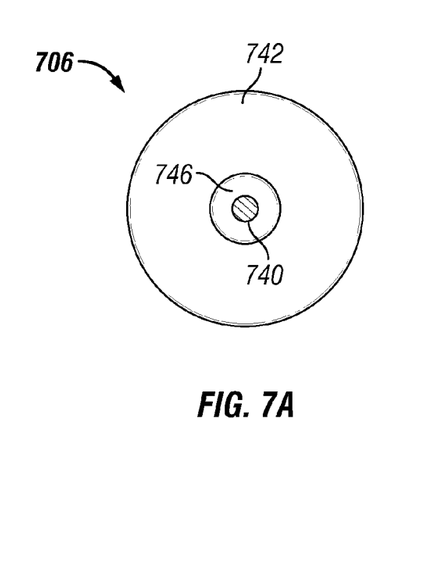
FIGS. 7A and 7B illustrate a cross-section of a fiber illustrating the structure thereof.
Figure 7B:
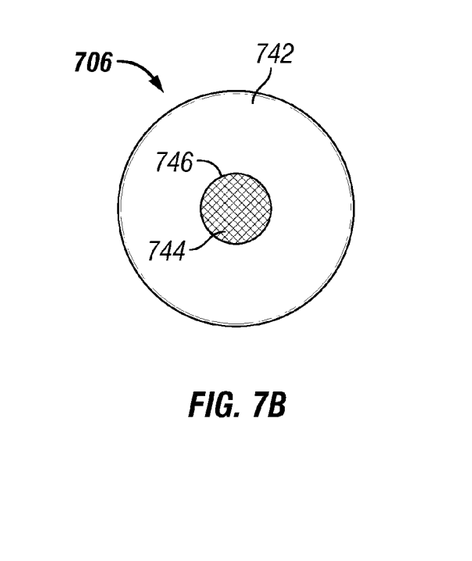

FIGS. 7A and 7B illustrate a cross-section of an optical fiber 706 comprising cladding 742 and core 746. FIG. 7A illustrates a cross-section displaying a first modal profile 740 of a narrow spectrum light source, such as a VCSEL. For comparative purposes, FIG. 7B illustrates a cross-section displaying a second modal profile 744 of a broad spectrum light source, such as an LED. FIGS. 7A and 7B thus demonstrate that by comparison, the modal profile 744 of a broad spectrum light source, which fills the core 746, is significantly larger than the modal profile 740 of the narrow spectrum light source.

Multimode fiber has a larger core size than single-mode optical fiber. For instance, multimode fiber typically has a core diameter of approximately 50 to 80 µm, while single-mode fiber typically has a core diameter of approximately 8 to 10 µm. Multimode fiber has a smaller bandwidth-to-distance ratio than single-mode fiber, and thus it is usually used for communication over relatively short distances, such as, for example, 600 meters, with typical data rates of 10 Mbit/s to 10 Gbit/s. Among other things, multimode fiber has the ability to support more than one propagation mode, and can operate at wavelengths of about 850 nm and 1300 nm and beyond. Therefore, multimode fiber is well-suited to be combined with broad spectrum light sources, such as light-emitting diodes (LEDs). As used herein, the term "broad spectrum light source" means a light source configured to emit light having a spectral width spanning at least approximately 20 nm, as described in more detail below. By comparison, typical VCSEL sources, generally referred to as "narrow spectrum light sources," have a spectral width of less than approximately 20 nm. Broad spectrum light sources may be referred to as "non-coherent light sources," which refers to a physical property of the emitted light waves wherein each respective propagation mode of the light source does not interfere with the other respective propagation modes during propagation.

LEDs are considerably more robust than many other light sources. For instance, since LEDs are solid state devices, they typically operate at relatively low current and temperature levels, and the operational lifetime of an LED can often be multiple decades long. Additionally, LEDs are typically relatively resistant to vibration and other movement-based forces that might be encountered in a vehicular setting, such as in aircraft. LEDs may comprise a variety of inorganic semiconductor materials and may be configured to operate within a predetermined wavelength. For instance, LEDs may be configured to operate at infrared wavelengths (i.e., greater than approximately 760 nm), wavelengths corresponding to red light (i.e., between approximately 610 nm and 760 nm), wavelengths corresponding to orange light (i.e., between approximately 590 nm and 610 nm), wavelengths corresponding to yellow light (i.e., between approximately 570 nm and 590 nm), wavelengths corresponding to green light (i.e., between approximately 500 nm and 570 nm), wavelengths corresponding to blue light (i.e., between 450 nm and 500 nm), wavelengths corresponding to violet light (i.e., between 400 and 450 nm), wavelengths corresponding to ultraviolet light (i.e. less than approximately 400 nm), or even wavelengths corresponding to white light, which corresponds to the broad spectrum including the different color lights discussed above and encompasses all those wavelengths visible to the human eye.

By way of example, a broad spectrum light source may comprise an LED light source. In one embodiment, the broad spectrum LED may be configured to emit infrared light having a spectral width spanning at least approximately 20 nm at some point in the infrared spectrum. Alternatively, a broad spectrum LED may be an LED configured to emit light within the ultraviolet spectrum with a spectral width spanning at least approximately 20 nm.

LEDs operating in the visible spectrum may also be considered "broad spectrum light sources." For instance, in one embodiment, a broad spectrum LED may be configured emit red light having a spectral width spanning approximately 20 nm at some point between approximately 610 nm and 760 nm. In another embodiment, a broad spectrum LED may be configured to emit red light having a spectral width spanning approximately 50 nm at some point between approximately 610 nm and 760 nm. In another embodiment, a broad spectrum LED may be configured to emit red light having a spectral width spanning approximately 100 nm at some point between approximately 610 nm and 760 nm. In yet another embodiment, a broad spectrum LED may be configured to emit red light having a spectral width spanning approximately 125 nm at some point between approximately 610 nm and 760 nm. In yet another embodiment, a broad spectrum LED may be configured to emit red light having a spectral width spanning approximately 150 nm at some point between approximately 610 nm and 760 nm. Further exemplary broad spectrum LEDs may be configured to emit red, orange, yellow, green, blue, or violet light having a spectral width spanning at least approximately 20 nm at some point between approximately 400 nm and 760 nm.

Of course, suitable LEDs can also emit light spanning multiple visible light spectra. For instance, in one embodiment, a broad spectrum LED may be configured to emit light comprising at least two visible light spectra, such as, for example, at least red and orange light, at least orange and yellow light, at least yellow and green light, at least green and blue light, and at least blue and violet light, among other things. According to one embodiment, a broad spectrum LED may be configured to emit light spanning at least two visible spectra with a spectral width of at least approximately 20 nm. Alternatively, a broad spectrum LED may be configured to emit light spanning at least two visible spectra with a spectral width of at least approximately 50 nm. In another embodiment, a broad spectrum LED may be configured to emit white light spanning all of the visible light spectra with a spectral width of at least approximately 300 nm. As would be readily apparent to one skilled in the art, the preceding examples are illustrative of several exemplary broad spectrum light sources and are not to be taken in a limiting sense.

While LEDs offer a robust, inexpensive, and durable broad spectrum light source, it is to be understood, and would be understood by one of ordinary skill in the art, that any type of broad spectrum light source, such as a halogen, incandescent, fluorescent light sources, among other things, could be employed in various embodiments of the present application.

Figure 8:
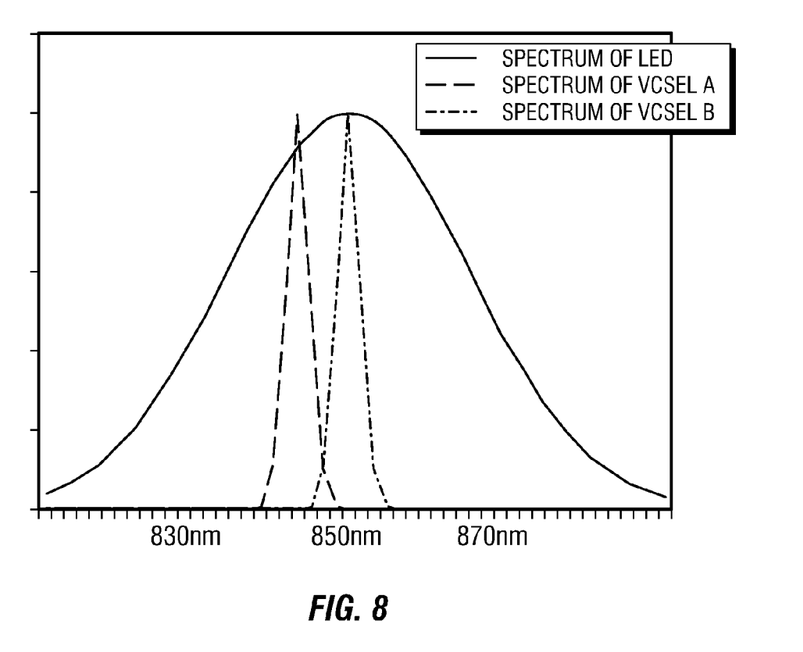
FIG. 8 is a graph that illustrates a spectrum comparison of an exemplary LED as compared to two exemplary VCSELs.

FIG. 8 illustrates a spectral comparison of one embodiment of an LED as opposed to the spectrum of two VCSELs, VCSEL A and VCSEL B. As shown in FIG. 8, the broad spectrum LED light spans a broader range of wavelengths than VCSEL light which is concentrated in narrower wavelength bands. Therefore, according to the current disclosure, an interrogator system may be configured to use a non-coherent light source, such as an LED, to significantly reduce the complexity and increase the viability of the interrogator system in a vehicular setting, such as, for example, in an aircraft. For instance, a broad spectrum, non-coherent light source, such as an LED, can provide light comprising a broad spectrum of wavelengths that all can propagate along a multimode fiber.

Figure 9:
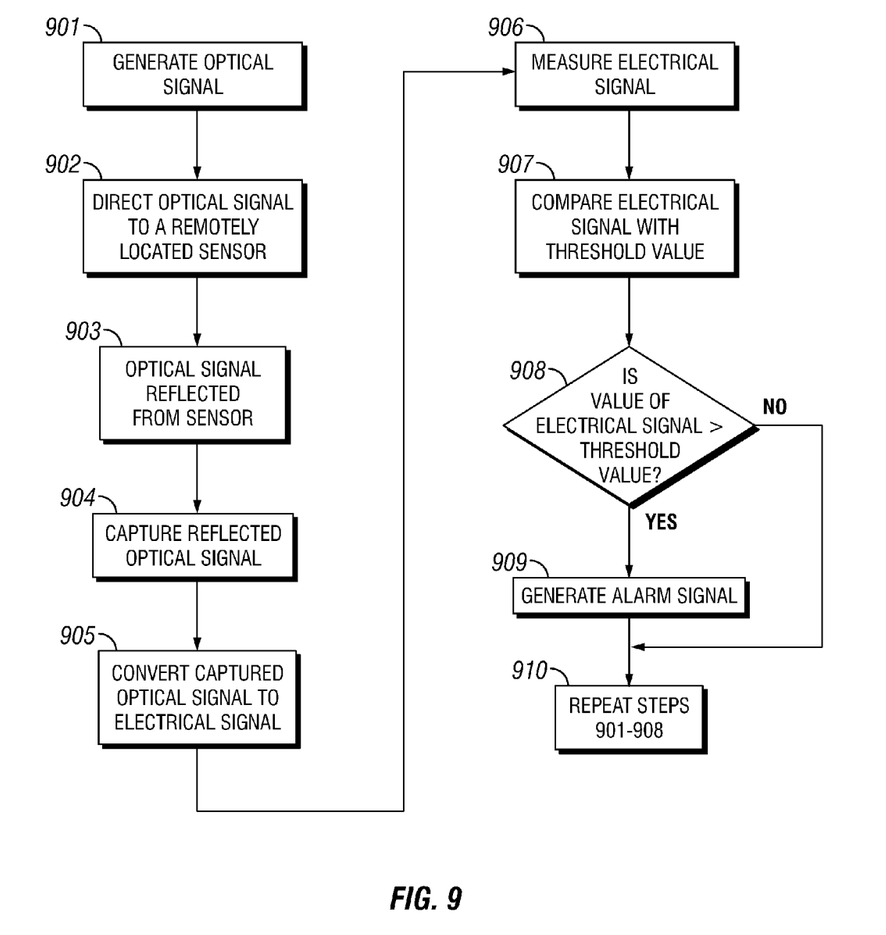
FIG. 9 is a block diagram illustrating steps of one embodiment of monitoring conditions of a vehicle using an optical sensor.

FIG. 9 illustrates an exemplary method of operating an optical interrogator system, such as the optical interrogator system 300 shown and described above in connection with FIG. 3. In a first method step 901, an optical interrogator 308 may generate an optical signal using a broad spectrum and/or non-coherent light source. For instance, the light source might comprise a broad spectrum LED, an incandescent light source, a halogen light source, fluorescent light source, high intensity light source, a plasma or arc lighting source, or some other suitable broad spectrum light source.

In a second method step 902, an optical signal from the optical interrogator 308 may be propagated via at least one multimode fiber 306 to a remotely located optical sensor 302. The remotely located optical sensor 302 may be located in a distinct location in a vehicle, or may be positioned adjacent to the optical interrogator 308. In some embodiments, the optical signal may be directed through a plurality of optical switches (see, e.g., 510 and 504(1)-504(n)) to selectively transmit the optical signal and/or portions thereof, to appropriate optical sensors.

In a third method step 903, the optical signal that was propagated via at least one multimode fiber 306 may be reflected by a remotely located optical sensor 302. As described above, the reflected optical signal may comprise one or more sensed parameters. Also as described above, a demultiplexer (see, e.g., 507a and 507b), may be configured to selectively transmit a predetermined wavelength of the reflected optical signal to a predetermined optical receiver configured to receive the predetermined wavelength of the reflected optical signal.

In a fourth method step 904, the optical interrogator 308 may be configured to receive the reflected optical signal comprising one or more sensed parameters. In a fifth method step 905, the optical interrogator 308 may be configured to convert the received optical signal to an electrical signal comprising one or more sensed parameters. For instance, the optical interrogator 308 may comprise an analog-to-digital converter 336 configured to convert the received optical signal into a digital electrical signal comprising one or more sensed parameters.

In a next method step 906, the newly converted electrical signal may be measured. In some embodiments, the newly converted electrical signal may be measured in a module of the optical interrogator 308. In other embodiments, the newly converted electrical signal may be measured by an external monitoring system such as, for example, monitoring system 609 shown in FIG. 6B. In a next method step 907, the measured electrical signal is compared with a threshold value. In a next method step 908, a determination is made based on the electrical signal comparison. For instance, in one embodiment, if the measured electrical signal is within a predetermined threshold range, then the system may continue to loop through the method steps 901 to 908. However, if the measured electrical signal is outside of the predetermined threshold, then the system may be configured to generate an alarm 909. For example, a signal outside of the predetermined threshold might indicate that the pressure at a vehicle door is outside of a predetermined tolerance and therefore, that the door might be approaching failure.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:
1. An optical interrogator system, comprising:
   a broad spectrum light source capable of emitting light having a spectral width spanning at least approximately 20 nm;
   at least one optical sensor coupled to the broad spectrum light source by at least one multimode optical fiber, wherein the at least one optical sensor comprises at least one photonic crystal coupled to the at least one multimode optical fiber;
   wherein the at least one multimode optical fiber is configured to support a plurality of propagation modes; and at least one optical receiver configured to receive an optical signal from the at least one optical sensor via the at least one multimode optical fiber.

2. The optical interrogator system of claim 1 further comprising:
at least one optical switch operatively coupled between the broad spectrum light source and the at least one optical sensor by at least one multimode optical fiber; and
a second and a third optical sensor also coupled to the at least one optical switch by a second and a third multimode optical fiber.

3. The optical interrogator system of claim 1 wherein the at least one multimode optical fiber has a core diameter of at least approximately 50 µm.

4. The optical interrogator system of claim 1 wherein the broad spectrum light source comprises an LED configured to emit at least one of infrared, red, orange, yellow, green, blue, violet, and ultraviolet light.

5. The optical interrogator system of claim 1 further comprising a signal conditioning converter unit, an analog-to-digital converter, and a microcontroller unit.

6. The optical interrogator system of claim 1, wherein the at least one photonic crystal further comprises an array of photonic crystals.

7. The optical interrogator system of claim 6, wherein the array is a two dimensional array.

8. The optical interrogator system of claim 6, wherein a reflection spectra of one photonic crystal in the array of photonic crystals changes in response to temperature.

9. The optical interrogator system of claim 6, wherein a reflection spectra of one photonic crystal in the array of photonic crystals changes in response to pressure.

10. A method of sensing at least one parameter with an optical interrogator system comprising a broad spectrum light source coupled to at least one optical sensor via a multimode optical fiber, the method comprising:
emitting an optical signal with a spectral width of at least 20 nm;
transmitting the optical signal along the multimode optical fiber to the at least one optical sensor, wherein the at least one optical sensor comprises at least one photonic crystal coupled to the multimode optical fiber; and
reflecting the optical signal along the multimode optical fiber to an optical receiver, wherein the reflected optical signal comprises at least one sensed parameter.

11. The method of claim 10 further comprising:
selectively transmitting the optical signal to the at least one optical sensor via an optical switch coupled along the multimode optical fiber between the broad spectrum light source and the at least one optical sensor; and
selectively receiving the reflected optical signal comprising at least one sensed parameter from the at least one sensor via the optical switch.

12. The method of claim 11 further comprising converting the selectively received reflected optical signal comprising at least one sensed parameter into an electrical signal.

13. The method of claim 12 further comprising:
measuring the converted electrical signal;
comparing the measured value with a predetermined threshold value; and
generating an alarm if the measured value exceeds the predetermined threshold value.

14. The method of claim 10 further comprising:
isolating a predetermined wavelength of the reflected optical signal; and
transmitting the predetermined wavelength of the reflected optical signal to the optical receiver configured to receive the predetermined wavelength of the reflected optical signal.

15. The method of claim 10, further comprising applying a range of voltages to a photonic crystal to change a reflectance property of the photonic crystal.

16. A vehicle, comprising:
an optical interrogator system, comprising:
a broad spectrum light source capable of emitting light having a spectral width spanning at least approximately 20 nm; and
at least one optical sensor coupled to the broad spectrum light source by at least one multimode optical fiber, wherein the at least one optical sensor of the optical interrogator system comprises at least one photonic crystal coupled to the at least one multimode optical fiber;
wherein the at least one multimode optical fiber is configured to support a plurality of propagation modes;
at least one optical receiver configured to receive an optical signal from the at least one optical sensor via the at least one multimode optical fiber; and
a monitoring system coupled to the optical interrogator system, and configured to receive a signal from the optical interrogator system.

17. The vehicle of claim 16 further comprising:
at least one optical switch operatively coupled between the broad spectrum light source and the at least one optical sensor of the optical interrogator system by the at least one multimode optical fiber; and
a second and a third optical sensor also coupled to the at least one optical switch by a second and a third multimode optical fiber.

18. The vehicle of claim 16 further comprising a second and a third photonic crystal coupled to the at least one multimode optical fiber.

19. The vehicle of claim 16 wherein the broad spectrum light source of the optical interrogator system comprises an LED configured to emit at least one of infrared, red, orange, yellow, green, blue, violet, and ultraviolet light.

20. The vehicle of claim 16 wherein the vehicle is an aircraft.

21. The vehicle of claim 16 wherein the monitoring system is configured to receive at least one sensed parameter from the optical interrogator system.

22. The vehicle of claim 16 wherein the monitoring system is configured to monitor at least one of a door and a fuel tank.

23. The vehicle of claim 16 further comprising a backup optical interrogator.

* * * * *